US012573171B2

(12) United States Patent
Brothers, III et al.

(10) Patent No.: US 12,573,171 B2
(45) Date of Patent: Mar. 10, 2026

(54) INTERLEAVED PROCESSING OF TEMPLATE DATA AND SEARCH DATA ACCORDING TO A SEARCH WINDOW

(71) Applicant: Arm Limited, Cambridge (GB)

(72) Inventors: John Wakefield Brothers, III, Calistoga, CA (US); Metin Gokhan Ünal, Cambridge (GB); Balaji Venu, Cambridge (GB); Rune Holm, Oslo (NO)

(73) Assignee: Arm Limited, Cambridge (GB)

( * ) Notice: Subject to any disclaimer, the term of this patent is extended or adjusted under 35 U.S.C. 154(b) by 287 days.

(21) Appl. No.: 18/431,565

(22) Filed: Feb. 2, 2024

(65) Prior Publication Data

US 2025/0252706 A1     Aug. 7, 2025

(51) Int. Cl.
*G06V 10/46* (2022.01)
*G06V 10/82* (2022.01)

(52) U.S. Cl.
CPC ............ *G06V 10/469* (2022.01); *G06V 10/82* (2022.01); *G06V 2201/07* (2022.01)

(58) Field of Classification Search
USPC ........................................ 382/197
See application file for complete search history.

(56) References Cited

U.S. PATENT DOCUMENTS

2014/0025895 A1     1/2014     Tran et al.

OTHER PUBLICATIONS

United Kingdom Combined Search and Examination report dated Jun. 23, 2025, for United Kingdom Application No. GB2418986.2.

*Primary Examiner* — Jacky X Zheng
(74) *Attorney, Agent, or Firm* — EIP US LLP

(57) ABSTRACT

A processor, method, and non-transitory computer-readable storage medium for processing template data and search data according to a search window applied to the search data. The search window comprising a set of offset positions. The processing is performed by a block matching engine (BME) that produces a tensor with difference values, and a convolutional engine (CE) that performs a convolutional operation on the tensor. The processing is performed in an iterative interleaved fashion, by dividing the set of offset positions into a plurality of subsets of offset positions. In parallel with processing of the first X offset positions by the CE, the BME generates the next X channels of the tensor, and which are subsequently pipelined through to the CE via an internal storage, etc.

20 Claims, 6 Drawing Sheets

500

200

302          304

404

406

402

600

800

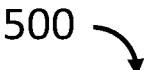

500

```
┌─────────────────────────────────────────────────────────────┐
│                          S502                               │
│  Accessing a plurality of subsets of offset positions from  │
│               the set of offset positions                   │
└─────────────────────────────────────────────────────────────┘
                              │
                              ▼
┌─────────────────────────────────────────────────────────────┐
│                          S504                               │
│       Perform iterative processing of the plurality of      │
│                         subsets                             │
└─────────────────────────────────────────────────────────────┘
```

S506
Dispatch first invocation data identifying a subset of offset positions and an output storage element in the internal memory

S514
Dispatch second invocation data identifying output storage element from earlier iteration in S26 as input storage element

S508
Determine tensor of SAD values

S516
Read tensor from input storage element

S510
Store tensor of SAD values in output storage element

S518
Performing a convolutional operation on the tensor

S512
Store tensor of SAD values in output storage element

S520
Store result from convolutional operation in memory

Yes

S522
More iterations?

No

S524
End

Fig. 8

INTERLEAVED PROCESSING OF TEMPLATE DATA AND SEARCH DATA ACCORDING TO A SEARCH WINDOW

BACKGROUND

Field of the Invention

The present invention relates to methods, processors, and non-transitory computer-readable storage media for interleaved processing of template data and search data according to a search window.

Description of the Related Technology

Certain data processing techniques, such as determining measures of similarity between template data and search data and performing a convolutional operation on the measures, involve the processing and generation of considerable amounts of data. It is desirable to efficiently handle the data implementing such data processing techniques.

SUMMARY

According to a first aspect of the disclosure, there is provided a processor for processing template data and search data according to a search window applied to the search data, the search window comprising a set of offset positions, the processor comprising an internal memory, a handling unit, a convolutional engine, CE, and a block matching engine, BME, wherein the BME being configured to indicate a measure of similarity between template data and search data. The BME is configured for receiving first invocation data indicating a plurality of offset positions, and an output storage element; and determining a tensor having a plurality of channels, by, for each offset position, offset the search data according to the offset position, determining difference values between the template data and the offset search data, writing the difference values in a channel of the tensor; and storing the tensor in the output storage element. The CE is configured for receiving second invocation data, the second invocation data identifying an input storage element, reading a tensor having a plurality of channels from the input storage element, and performing a convolutional operation on the tensor. The handling unit is configured for: accessing a plurality of subsets of offset positions from the set of offset positions; performing interleaved iterative processing of the plurality of subsets of offset positions, using the CE and the BME, comprising, for each iteration: dispatching first invocation data to the BME identifying a subset of offset positions among the plurality of subsets of offset positions; and an output storage element in the internal memory; and dispatching second invocation data to the CE identifying, as input storage element, the output storage element as identified in first invocation data dispatched to the BME in a previous iteration. The processor is configured for storing a result from the convolutional operation performed by the CE in internal memory.

According to a second aspect of the present disclosure, there is provided a method performed by a processor when processing template data and search data according to a search window applied to the search data, the search window comprising a set of offset positions, the processor comprising an internal memory; the method comprising: accessing a plurality of subsets of offset positions from the set of offset positions; performing interleaved iterative processing of the plurality of subsets of offset positions, comprising, for each iteration: dispatching first invocation data identifying a subset of offset positions among the plurality of subsets of offset positions; and an output storage element in the internal memory; determining a tensor having a plurality of channels, by, for each offset position of the subset of offset positions identified in the first invocation data, offset the search data according to the offset position, determining difference values between the template data and the offset search data, writing the difference values in a channel of the tensor; and storing the tensor in the output storage element identified in the first invocation data; dispatching second invocation data identifying, as an input storage element, the output storage element as identified in first invocation data dispatched in a previous iteration; reading a tensor having a plurality of channels from the input storage element identified in the second invocation data, performing a convolutional operation on the tensor; and storing a result from the convolutional operation in internal memory.

According to a third aspect of the present disclosure, there is provided a non-transitory computer-readable storage medium comprising a set of computer-readable instructions stored thereon which, when executed by a processor, comprising an internal memory, are arranged to cause the processor to process template data and search data according to a search window applied to the search data, the search window comprising a set of offset positions, by: accessing a plurality of subsets of offset positions from the set of offset positions; performing interleaved iterative processing of the plurality of subsets of offset positions, comprising, for each iteration: dispatching first invocation data identifying a subset of offset positions among the plurality of subsets of offset positions; and an output storage element in the internal memory; determining a tensor having a plurality of channels, by, for each offset position of the subset of offset positions identified in the first invocation data, offset the search data according to the offset position, determining difference values between the template data and the offset search data, writing the difference values in a channel of the tensor; and storing the tensor in the output storage element identified in the first invocation data; dispatching second invocation data identifying, as an input storage element, the output storage element as identified in first invocation data dispatched in a previous iteration; reading a tensor having a plurality of channels from the input storage element identified in the second invocation data, performing a convolutional operation on the tensor; and storing a result from the convolutional operation in internal memory.

BRIEF DESCRIPTION OF THE DRAWINGS

Further features and advantages will become apparent from the following description of preferred embodiments, given by way of example only, which is made with reference to the accompanying drawings in which like reference numerals are used to denote like features.

FIG. 8 shows a flow chart of a method for processing template data and search data according to a search window applied to the search data according to embodiments.

DETAILED DESCRIPTION

Figure 1:
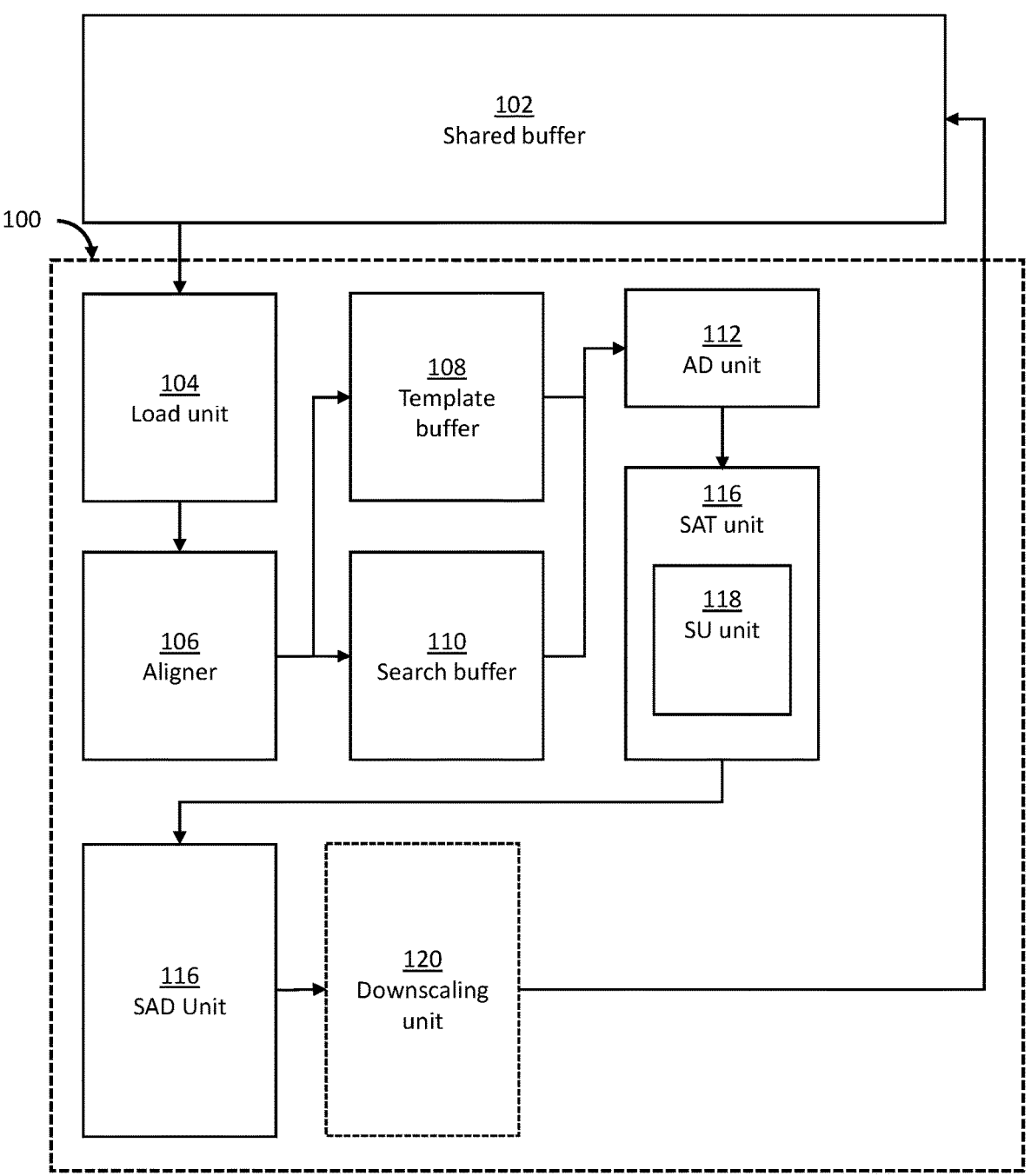
FIG. 1 illustrates schematically an architecture of a block matching engine according to embodiments.

This disclosure describes procedures, as well as methods, systems, and computer-readable media for handling data when processing template data and search data according to a search window applied to the search data. In particular, this disclosure describe such procedures, as well as methods, systems, and computer-readable media for handling data when performing interleaved processing of a first processing and a second processing, wherein a first processing includes determining measures of similarity between the template data and the search data by applying a plurality of offset positions to the search data and wherein a second processing includes performing a convolutional operation on the resulting multi-dimensional tensor comprising the measures of similarity.

A first aspect of the disclosure relates to a processor for processing template data and search data according to a search window applied to the search data. The template data and the search data have the same number of dimensions. For example, the template data and the search data may each be a 2D tensor, such as for example (a channel of) an image. In some embodiments, the template data and the search data may comprise a tensor having more than two dimensions, such as for example a RGB image, or activations from a convolutional neural network (CNN).

The processor comprises an internal memory, a handling unit, a convolutional engine, CE, and a block matching engine, BME. The internal memory is connected to the CE and the BME and used to pass data between these units.

The BME is configured to indicate a measure of similarity between template data and search data. For that reason, the BME is configured for: receiving first invocation data indicating a plurality of offset positions, and an output storage element. The BME is configured for determining a tensor having a plurality of channels, by, for each offset position, offset the search data according to the offset position, difference values between the template data and the offset search data, and writing the difference values in a channel of the tensor. The tensor is then stored in the output storage element indicated by the first invocation data. The resulting tensor may be a 3D volume, wherein 2D SAD values are stored in a channel of the tensor. For example, for a 2D template data and a 2D search data, each difference value may correspond to a measure of similarity between a 2D portion of the template data and a corresponding 2D portion (according to the offset) of the search data. The difference values (may be referred to as difference data herein) may be embodied by one of sum of absolute differences, SAD, values, or sum of squared differences, SSD, values. In the following, SAD values will be primarily used to illustrate the block matching techniques. However, it is important to note that SSD values could also be effectively utilized in this context. In the case of the search data and the template data comprising 3D data, each difference value (SAD or SSD) may correspond to a measure of similarity between a 3D volume of the template data and a corresponding 3D volume (according to the offset) of the search data.

The CE is configured for receiving second invocation data, the second invocation data identifying an input storage element, reading a tensor having a plurality of channels from the input storage element, and performing a convolutional operation on the tensor.

The BME thus generates a SAD value for each search position in the search window and writes that out to a different channel at the XY position corresponding to the current data item in the template data. For example, if the template and search data corresponds to image frames and the search window is 15×15, for XY=10,10 in frame N+1, the BME will generate 255 (15×15) SAD values and write those out to 255 channels for output position 10,10. For a H×W output region (i.e., the size of the template data), the BME outputs a H×W×D tensor where D is the search window area.

Depending on the size of the internal memory, such large volumes of data (H×W×D) may be too large to store in the internal memory of the processor. The processor thus supports generating a portion of D in each iteration of an iterative process. For that reason, the handling unit is configured accessing a plurality of subsets of offset positions from the set of offset positions. The handling unit is further configured for performing interleaved iterative processing of the plurality of subsets of offset positions, using the CE and the BME. The CE can thus consume the output from the BME from a previous iteration, which allows the combined operation of the BME and the CE to increase efficiency, and not be limited by internal memory size or memory bandwidth to external memory (for intermediate storage).

The handling unit is thus configured to, for each iteration, dispatch first invocation data to the BME identifying a subset of offset positions among the plurality of subsets of offset positions; and an output storage element in the internal memory; and dispatch second invocation data to the CE identifying, as input storage element, the output storage element as identified in first invocation data dispatched to the BME in a previous iteration.

Advantageously, in parallel with processing of the first X offset positions (e.g., 16, H×W×16) by the CE, the BME generates the next X channels, and which are subsequently pipelined through to the CE via the internal storage, etc.

The processer is configured for storing a result from the convolutional operation performed by the CE in internal memory. The results may then be further processed, e.g., by a motion vector determining unit configured to read the stored output from the CE and process the output to determine the plurality of motion vectors defining data movements between the template data and search data.

In some examples, the internal memory comprises a first and a second storage element, wherein the handling unit is configured for performing the interleaved iterative processing of the plurality of subsets of offset position by: for a first subset of offsets positions, dispatching first invocation data to the BME, the invocation data defining the first subset of offsets positions and the first storage element as output storage element; for each subset of offsets positions excluding the first sub-set of offsets positions: alternating between using the first and the second storage element as output storage element for the BME, and using the other one of the first and second storage element as the input storage element of the CE; dispatching second invocation data to the CE identifying the input storage element according to the alternating; dispatching first invocation data to the ME indicating the subset of offsets positions and the output storage element according to the alternating.

Double buffering is a technique designed to reduce processing delays in scenarios where data is processed by two units (BME and CE) in an interleaved fashion. The internal memory comprises two memory buffers, labelled first storage element and second storage element.

Initially, the BME processes the data according to the first subset of offsets positions and stores its output in the first storage element. While this is happening, the second storage element is idle. As soon as the BME moves on to process data according to the next subset of offsets positions, which it then stores in the second storage element, the CE starts processing the data from first storage element. This simultaneous operation allows both units to work in parallel without waiting for each other.

Once the BME completes processing data for the second storage element, and the CE is done with the first storage element, they swap storage elements. The CE now begins to process the new data in the second storage element, while the BE starts filling the first storage element with the next set of data. This cycle continues, ensuring a constant flow of data processing with minimal idle time for both units.

This method is particularly effective in reducing latency in data processing as set out herein, as it eliminates the downtime that would occur if each unit had to wait for the other to finish before starting its task.

In some examples, each subset of offset positions comprises a predetermined number of offset positions. Advantageously, memory allocation may be simplified. Moreover, the predetermined number may be adapted based on the processing capabilities of the processor, to optimize in terms of memory access patterns and processing routines. The predetermined number of offset positions may for example be a multiple of 8.

In some examples, one or more of the offset positions in the set of offset positions are skipped in the plurality of subset of offset positions, such that each subset comprises the predetermined number of offset positions. Consequently, the efficiency of the processing may be improved. The processor thus supports processing a partial set of offset positions to improve performance by eliminating output of SAD results for less important search positions.

In some examples, the set of offset positions is ordered according to a predefined search pattern, wherein the skipping one or more of the offset positions comprises skipping one or more offset positions ordered last in the ordered set of offset positions. Consequently, processing of offset positions that are considered to less likely to result in low SAD values can be skipped, since such positions may be less likely to result in a matched data between the search data and the template data.

In some examples, each subset comprises continuous offset positions from the search window in one of a: vertical direction or horizontal direction. Consequently, loading of the search data according to the subset of offset positions may be more efficient since the offset positions in the subset are contiguous.

In some examples, the processor further comprises a motion vector determining unit, MVDU, configured to read the stored output from the CE, and process the output to determine the plurality of motion vectors defining data movements between the template data and search data. The processing of the MVDU may comprise inferring the data movements (e.g., motion vectors) from the convolved data (typically a multi-dimensional data) via neural network inference. The processing of the MVDU may comprise fitting a quadratic function to the convolved data to define a minimum cost solution (e.g., by computing partial derivates). In the latter case, a combination of convolutional processing and mathematical optimization is implemented to determine data movements such as motion vectors.

In some examples, the search window is one of: rectangular, elliptical, or circular. Depending on the selection, the offset positions may be ordered differently. For example, in an elliptical or circular setting, the ordering may comprise ordering the offset positions such that the window is processed from the centre outwards, spiralling around the centre outwards. For a rectangular search window, a raster order may be used for ordering the offset positions, to offer contiguous search positions.

In some examples, the BME is configured for, prior to storing the tensor in the output storage element, downscaling each SAD value by applying a predefined scaling equation the SAD value. SAD values may be produced as 16-bit integers, reflecting the total absolute difference in between the blocks of data being compared. However, in practice, the raw magnitude of these SAD values can be less informative than their relative differences. For example, in block matching, large SAD values usually signify that there is no good match between the data blocks. In these cases, the specific magnitude of the SAD value is less important. The exact difference between these high values does not necessarily contribute much to the analysis. Consequently, to make the SAD values more informative and useful, scaling may be applied. Scaling involves adjusting the range and sensitivity of the SAD values to highlight differences that are most relevant to the task at hand. Advantageously, scaling may help to mitigate the impact of noise and other irrelevant variations. Moreover, scaled SAD values may be handled more efficiently in computation. For example, scaling down to a smaller range can reduce the computational load, memory usage, or fit better with the precision limits of the hardware. For example, scaling with a factor 2 (computing the square root of the SAD value) reduces the output memory footprint by a factor of 2 and doubles the processing speed in the CE when this data is consumed in a convolution layer.

In some examples, the template data and the search data each comprises a 2D tensor. The 2D tensor may for example correspond to image data.

In a second aspect, there is provided a method performed by a processor when processing template data and search data according to a search window applied to the search data, the search window comprising a set of offset positions, the processor comprising an internal memory; the method comprising: accessing a plurality of subsets of offset positions from the set of offset positions; performing interleaved iterative processing of the plurality of subsets of offset positions, comprising, for each iteration: dispatching first invocation data identifying a subset of offset positions among the plurality of subsets of offset positions; and an output storage element in the internal memory; determining a tensor having a plurality of channels, by, for each offset position of the subset of offset positions identified in the first invocation data, offset the search data according to the offset position, determining sum-of-absolute-difference, SAD, values between the template data and the offset search data, writing the SAD values in a channel of the tensor; and storing the tensor in the output storage element identified in the first invocation data; dispatching second invocation data identifying, as an input storage element, the output storage element as identified in first invocation data dispatched in a previous iteration; reading a tensor having a plurality of channels from the input storage element identified in the second invocation data, performing a convolutional operation on the tensor; and storing a result from the convolutional operation in internal memory.

The second aspect may generally have the same features and advantages as the first aspect.

For example, in some embodiments, wherein the internal memory comprises a first and a second storage element, the performing the interleaved iterative processing of the plurality of subsets of offset position comprises: for a first subset of offsets positions, dispatching first invocation data the invocation data defining the first subset of offsets positions and the first storage element as output storage element; for each subset of offsets positions excluding the first sub-set of offsets positions: alternating between using the first and the second storage element as output storage element of first invocation data, and using the other one of the first and second storage element as the input storage element second invocation data; dispatching second invocation identifying the input storage element according to the alternating; and dispatching first invocation data indicating the subset of offsets positions and the output storage element according to the alternating.

For example, in some embodiments, each subset of offset positions comprises a predetermined number of offset positions.

For example, in some embodiments, one or more of the offset positions in the set of offset positions are skipped in the plurality of offset positions, such that each subset comprises the predetermined number of offset positions.

For example, in some embodiments, the set of offset positions is ordered according to a predefined search pattern, wherein the skipping one or more of the offset positions comprises skipping one or more offset positions ordered last in the ordered set of offset positions.

For example, in some embodiments, the method further comprises processing results from the convolutional operation to determine the plurality of motion vectors defining data movements between the template data and search data.

For example, in some embodiments, the method further comprises, prior to storing the tensor in the output storage element, downscaling each SAD value by applying a predefined scaling equation the SAD value.

According to a third aspect of the present disclosure, there is provided a non-transitory computer-readable storage medium comprising a set of computer-readable instructions stored thereon which, when executed by a processor, comprising an internal memory, are arranged to cause the processor to process template data and search data according to a search window applied to the search data, the search window comprising a set of offset positions, by: accessing a plurality of subsets of offset positions from the set of offset positions; performing interleaved iterative processing of the plurality of subsets of offset positions, comprising, for each iteration: dispatching first invocation data identifying a subset of offset positions among the plurality of subsets of offset positions; and an output storage element in the internal memory; determining a tensor having a plurality of channels, by, for each offset position of the subset of offset positions identified in the first invocation data, offset the search data according to the offset position, determining sum-of-absolute-difference, SAD, values between the template data and the offset search data, writing the SAD values in a channel of the tensor; and storing the tensor in the output storage element identified in the first invocation data; dispatching second invocation data identifying, as an input storage element, the output storage element as identified in first invocation data dispatched in a previous iteration; reading a tensor having a plurality of channels from the input storage element identified in the second invocation data, performing a convolutional operation on the tensor; and storing a result from the convolutional operation in internal memory.

The third aspect may generally have the same features and advantages as the first aspect.

Interleaved Processing

The present disclosure relates to interleaved processing of a block matching engine (BME) and a convolution engine (CE) implemented in a processor. In the following, block matching in 2D tensor data corresponding to a search image and a template image will be used to exemplify the techniques described herein. However, it should be noted that the techniques described herein are not limited to using images or 2D tensor data and can be applied to multidimensional data (more than 2 dimensions), such as RGB image data or other types of data.

Moreover, the techniques described herein will be exemplified for the use of determining motion vectors between the search image and the template image. However, other use cases apply, such as any use case involving pattern recognition between a first (template) data and a second (search) data.

In the context of video processing, a BME may be used for analysing and comparing frames to determine motion or differences. The BME operates by receiving pairs of images, such as portions of consecutive frames (frame N and N+1) in a video sequence, or the left and right frames in stereo imaging. The primary task of this unit is to identify how a specific block of pixels in one frame, e.g., frame N+1, has moved or changed relative to the previous frame, frame N. The block matching process involves defining a search window within frame N. This window sets the boundary for where the unit can search for a match to a corresponding block in frame N+1. The size and shape of this window is predetermined. For example, the shape may be one of rectangular, elliptical, or circular. The size for a rectangular search window may be a square of dimensions such as 15×15 pixels. Within this window, the BME performs a detailed search to locate the best match.

To quantify the similarity between blocks, the BME employs the Sum of Absolute Differences (SAD) technique. SAD calculates the aggregate difference in pixel values between two blocks. For example, the BME might compare a 5×5 pixel block centred around a target pixel in frame N+1 with various 5×5 pixel blocks within the 15×15 search window in frame N. This comparison is done for all potential positions within the search window, effectively evaluating every possible movement or change that could have occurred. The structure of this tensor may look like this. For each pixel (or block) in frame N+1, identified by coordinates like X,Y=10,10, the BME computes a multitude of SAD values corresponding to each position in the search window. If the search window is 15×15, this results in 225 (15×15) distinct SAD values. Each of these values is then assigned to a unique channel in the tensor, corresponding to the XY position of the block being analysed in frame N+1. The final output of this process is a tensor with dimensions H×W×D, where H and W represent the height and width of the region being analysed, and D is the total number of positions in the search window, also referred to as offset positions.

In certain modes, e.g., a cost volume mode, the BME generates a comprehensive dataset of SAD values. For each potential match within the search window, a unique SAD value is calculated and stored. These values are then organized into a tensor, a multi-dimensional array that captures the entire landscape of potential movements.

The BME can be integrated with a convolutional engine, CE. This combination leverages the strengths of both block matching for detailed motion analysis and convolutional processing for feature extraction and pattern recognition. The convolutional engine processes the tensor generated by the block matching unit, preparing the data for various advanced applications, including graphics and video super-resolution, camera pipeline processing for still images, stereo, video, and object tracking, etc.

It should be noted that the SAD values produced by the BME and stored in a buffer may be accessed and processed by processing units different from the CE. For example, one alternative arrangement is to run softmin (possibly on a vector engine) on the SAD values to get a probability distribution of the best match between search offsets, and then calculating the best match vector as a real number. Alternatively, the full volume of SAD values can also be exposed to a GPU and GPU can infer the motion vector from the SAD values. In the below, embodiments of integration of the BME and CE will be discussed.

Processing the entire search window within the BME can be an efficient approach. However, the resulting tensor, with its H×W×D dimensions, might pose a challenge in terms of storage. The size of this tensor could exceed the capacity of the internal memory available to the processor executing the BME and CE tasks. If this situation necessitates storing the tensor in external memory, it could lead to significant performance issues. The limited bandwidth and higher latency associated with external memory access may create a bottleneck, hindering the efficient processing and movement of data required for these operations.

Figure 7:
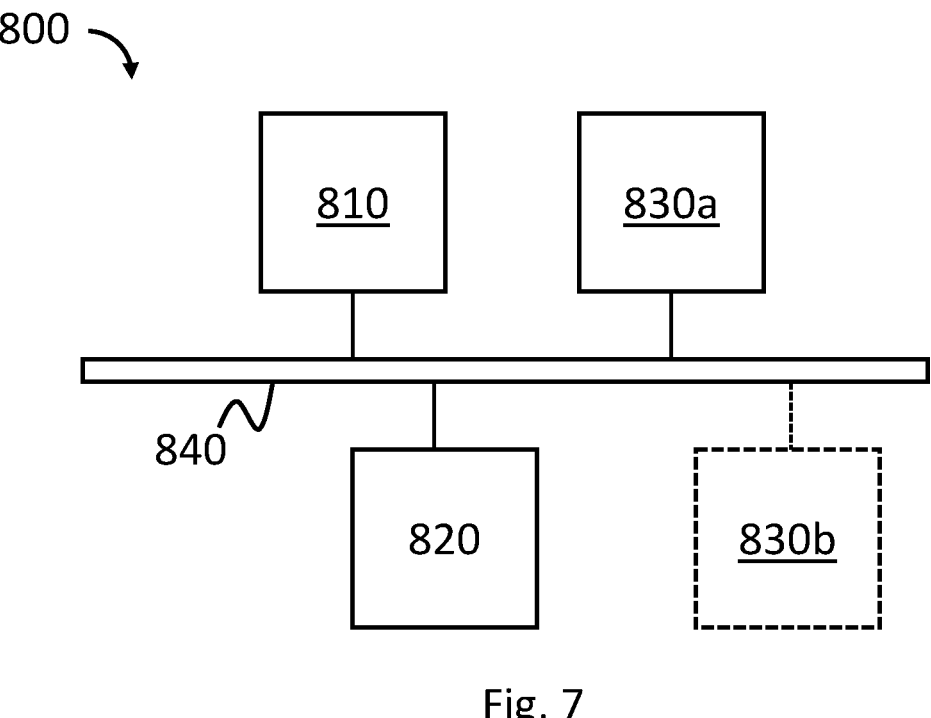
FIG. 7 illustrates schematically an example system for allocating handling of data according to embodiments.

FIG. 7 shows a flow chart of an interleaved processing 500 of the BME and CE tasks, to reduce the problems discussed above, and in which a portion of D is generated in each iteration.

The interleaved processing method 500 comprises accessing S502 a plurality of subsets of offset positions from the set of offset positions, such that each subset can be processed by the BME in each iteration. To enhance the efficiency of the BME, the total set of offset positions within the search window can be strategically divided into several smaller subsets. Each of these subsets contains a specific number of offset positions, which can be processed by the BME in each iteration. This division may be structured so that each subset includes a predetermined number of offset positions, potentially aligning with a multiple of 8 for operational efficiency.

In some implementations, this method may involve selectively skipping certain offset positions when segmenting the search window into multiple sub-search windows (subsets of offset positions). For example, this may be done in order to ensure that each subset consistently contains this predetermined number of offset positions. For instance, if the total number of offset positions cannot be evenly divided by eight, the last subset might end up with fewer positions than the others. In such a case, the remaining offset positions that do not fit into the multiples of 8 can be excluded from the subsets.

Dividing the set of offset positions may be done based on the shape of the search window. Moreover, the dividing may be done such that earlier subsets may have an increased likelihood of resulting in low SAD values (i.e., well matched blocks). Advantageously, this may allow an increased efficiency, since one or more offset positions (less likely to result in a matched data between the search image and the template image) may be skipped. In other embodiments, the dividing may be done such that loading of the search data according to the subset of offset positions may be more efficient since the offset positions in the subset are contiguous.

Figure 3:
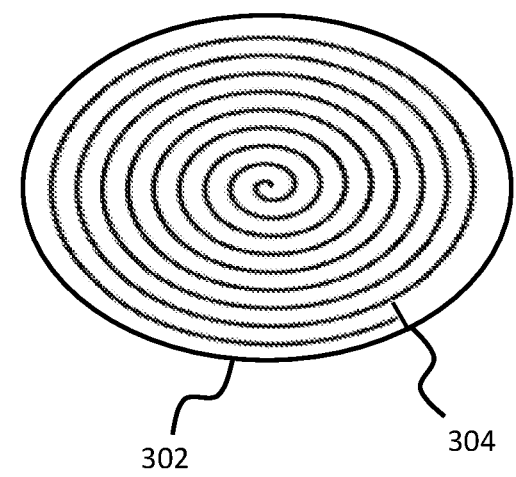
FIG. 3 illustrates a first predefined search pattern for ordering a set of offset positions of the search window, according to embodiments.
Figure 4:
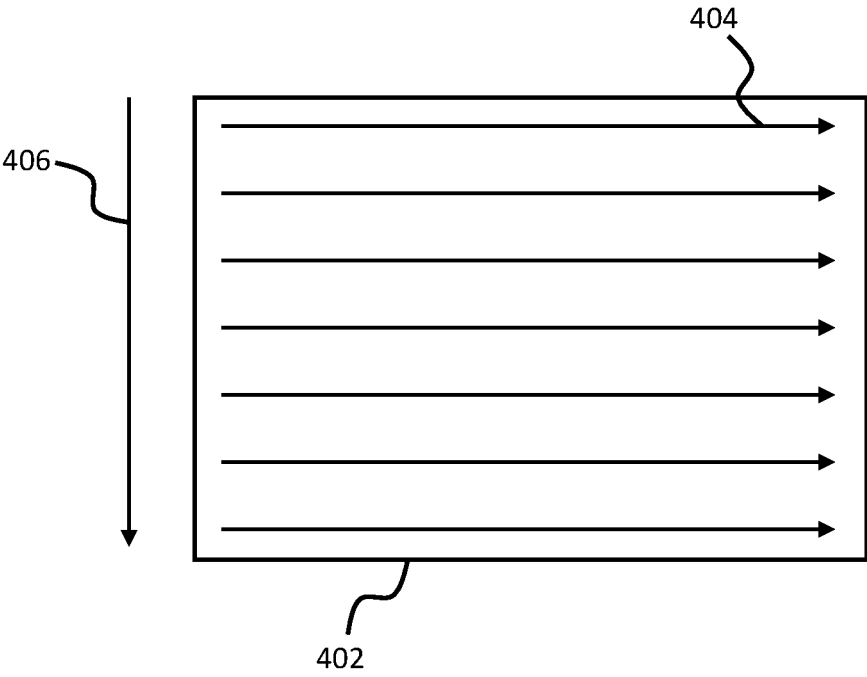
FIG. 4 illustrates a second predefined search pattern for ordering a set of offset positions of the search window, according to embodiments.

FIGS. 3 and 4 shows by way of example two different search patterns including an ordering of the offset positions of respective search window.

FIG. 3 shows an elliptical search window 302. The line in the search window 302 represents the search pattern, starting from the origin and circling outwards towards the edges of the search window 302. In the block matching process, the search window is thus navigated in a specific pattern, starting from the centre and gradually moving outwards in a spiral manner. This approach allows for a prioritized examination of offsets, with the initial focus being on those closest to the centre. For performance optimization, it is possible to limit the processing to only the first set of positions, perhaps the first 64 or 96 out of for example a total number of 176 (given a diameter of 15). The underlying rationale for this strategy is the assumption that offsets further from the centre are less likely to yield accurate block matches. Therefore, excluding these outer positions can be an effective way to balance performance, reducing computational load without significantly compromising the accuracy of the block matching. For example, one or more of the offset positions may be skipped, such that a search offset 304 not being the last among the search offset in the search window 302 may anyway be the last search offset processed by the BME.

FIG. 4 show a rectangular search window. In this embodiment, the dividing the set of offset positions into a plurality of subsets of offset positions may comprise defining each subset with continuous offset positions from the search window in one of a: vertical direction 404 or horizontal direction 406. Put differently, a raster order approach for applying search offsets in a rectangular search window may be adopted. Such order may enhance the efficiency of the BME, since this systematic approach may allow for a continuous portion of the two input images to be loaded when processing a plurality of search offsets (the subset) as a batch. This technique may optimize memory usage by reducing the frequency of data loading and also aligns well with typical memory storage patterns, enhancing cache efficiency.

Returning to FIG. 7, when a plurality of subsets of offset positions has been accessed S502 from the set of offset positions (potentially skipping some of the offset positions for efficiency), an iterative processing of the plurality of subsets may be performed S504.

Specifically, for each subset, first invocation data may be dispatched S506 for the BME to receive. The first invocation data may identify a subset of offset positions among the plurality of subsets of offset positions; and an output storage element in the internal memory. The BME may, when receiving the first invocation data, determine S508 a tensor having a plurality of channels, by, for each offset position of the subset of offset positions identified in the first invocation data, offset the search data according to the offset position, determining sum-of-absolute-difference, SAD, values between the template data and the offset search data, and write the SAD values in a channel of the tensor. The BME may store S512 (continuously or in one go) the tensor in the output storage element identified in the first invocation data.

Put differently, the BME is specifically configured to process segments of the search window in separate invocations, a method that ensures its output remains within the capacity of the internal SRAM. This approach effectively avoids the necessity of resorting to external memory, which is particularly beneficial when the output is subsequently processed by the CE.

For example, the search window may have the size 15×15 and reach from −7, −7 to +7, +7. In the initial invocation, the BME focuses on generating data for channels 0 through 15. Following this, the next invocation tackles the subsequent set of channels, handling channels 16 to 31. This process continues in a systematic manner; by the time the BME reaches its 13th invocation, it is working on channels 208 to 223. Occasionally, the ME might skip certain search positions, like (7,7), especially in scenarios where the search window's total number of positions does not evenly distribute across the invocations. This structured, iterative process allows the BME to efficiently manage and process data within the confines of the internal memory (SRAM), optimizing performance by reducing the dependency on slower external memory resources. Generally, the correspondence between search position and output channel number is fixed according to the specified search window shape (ellipse or rectangle).

Interleaved with the processing of the BME, an iteration of the iterative process comprises dispatching S514 second invocation data for the CE to receive. The second invocation data identifies, as an input storage element, the output storage element as identified in first invocation data dispatched in a previous iteration. Put differently, the CE thus consume the output (a tensor) from the BME from a previous iteration. The CE reads S516 the tensor having a plurality of channels from the input storage element identified in the second invocation data and performs S518 a convolutional operation on the tensor. The result from the convolutional operation is then stored S520 in the internal memory.

After each iteration, it is determined S522 if more iterations are to be performed, i.e., if unprocessed subsets of offsets still exist among the plurality of subsets as determined S502. When all subsets have been processed, the method is ended S524.

It should be noted that FIG. 7 does not include an initial step of processing the first subset of offsets by the BME, nor the final step of processing, by the CE, the tensor produced by the BME for the last subset of offsets. These steps are performed by the BME and CE respectively, as described above.

Hardware Implementation

Figure 2:
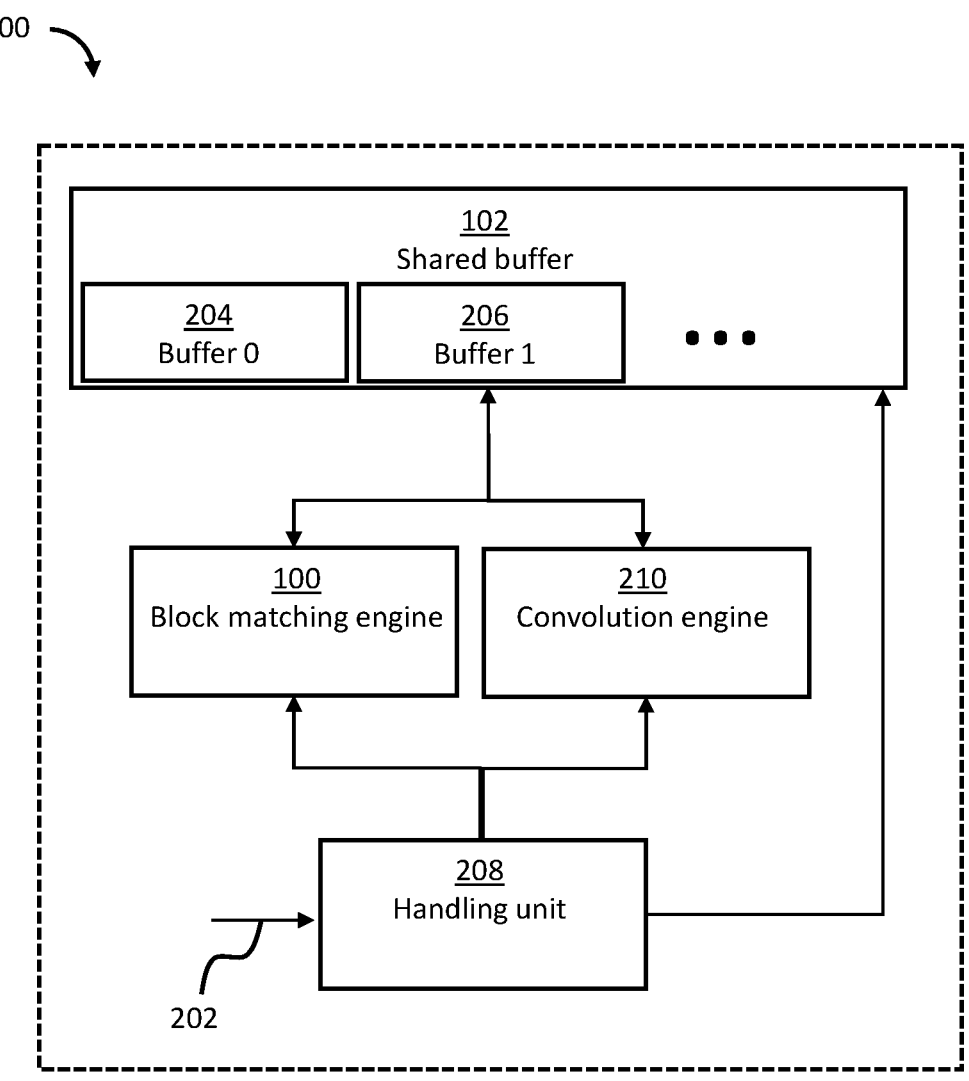
FIG. 2 illustrates schematically an architecture of a processor for processing template data and search data according to a search window applied to the search data according to embodiments.

FIG. 2 illustrates schematically an architecture of a processor 200 (which may be referred to as an offload processor below) for processing template data and search data according to a search window applied to the search data, for example as described above in conjunction with FIG. 7.

The processor 200 comprises an internal memory (shared buffer) 102, a handling unit 208, a convolutional engine, CE, 210 and a block matching engine, BME 100.

The BME 100 is configured to indicate a measure of similarity between template data and search data. Specifically, the BME 100 is configured to receive first invocation data from the handling unit 208. The first invocation data indicating a plurality of offset positions, and an output storage element. The BME 100 is further configured to receive the template data and the search data to process. This may be achieved by the first invocation data further identifying a template buffer in the shared buffer 102 comprising with the template data, a search buffer in the shared buffer 102 comprising the search data. The template data and the shared data may be indicated to or received by the BME 100 in any other suitable means.

The BME 100 is further configured to determine a tensor having a plurality of channels, by, for each offset position, offset the search data according to the offset position, determining sum-of-absolute-difference, SAD, values between the template data and the offset search data, writing the SAD values in a channel of the tensor; and storing the tensor in the output storage element as indicated in the first invocation data.

The SAD data may be achieved using any suitable techniques. Generally, block matching involving two data (such as images) using blocks of a certain size (e.g., 5×5) can be explained through a known process that involves Absolute Differences (AD), Summed Area Table (SAT), and SAD. First, the images are divided into smaller blocks, such as 5×5 or any other suitable size such as 4×4 or 9×9. For each block in the first image, the algorithm searches for the most similar block in the second image.

To compare blocks, AD is calculated by taking the absolute difference between corresponding pixel values of a block from the search image and a block from the template image. However, directly calculating AD for each pixel in every possible 5×5 block across the images would be computationally intensive.

To reduce the complexity, SAT can be used. SAT is a technique used to quickly calculate the sum of values in a rectangular subset of a grid. By calculating a SAT from the AD data, it becomes much quicker to find the sum of pixel values for any 5×5 block within the image.

With SAT data available, the SAD for each block comparison can be efficiently computed. SAD is the sum of the absolute differences for each pixel in the block. It is a measure of similarity between two blocks, lower SAD values indicate more similar blocks. By comparing the SAD for a block in the first image with all possible (e.g., within a search window) 5×5 blocks in the second image, the algorithm may identify the block with the lowest SAD value as the best match.

This process is repeated for each 5×5 block in the first image, effectively matching blocks across the two images based on their SAD values, which are efficiently computed using the pre-calculated SAT data.

FIG. 1 shows schematically an architecture of a BME 100 according to embodiments.

The BME 100 is connected to the shared buffer 102, which comprises a plurality of memory banks. The shared buffer 102 is connected to the units of the BME 100 and used to pass data between the units. The shared buffer 102 contains input data (not shown), i.e., the first image and the second image. The first image and the second image are typically parts of a larger first and second image frame, i.e., a XY region of frame 1 in a video sequence, and the corresponding region in frame 0. For example, the first image and the second image may be stripes of the first and second image frame. The processor implementing the BME 100 comprises a direct memory access (DMA) unit for loading the input data into the shared buffer. The BME 100 is configured to indicate a measure of similarity between template data (e.g., a template image) and search data (e.g., a search image) for example for the purpose of determining motion vectors between the two images.

The BME 100 further comprises a load unit 104. The load unit 104 loads a portion of the template image and a corresponding portion of the search image. Typically, the loaded portions may be a multiple of "bricks" of the input data, 4 wide and 8 high. Advantageously, this may facilitate efficient read and write to the shared buffer. The portions of the first and/or second image needed to be loaded for the current offset may typically be unaligned with brick boundaries. Consequently, the loaded portions need to be aligned according to the current search offset, which is handled by the aligner 106. The aligner 106 comprises a horizontal aligner and a vertical aligner.

The loaded and aligned portions may be stored in a template buffer 108 and a search buffer 110.

The BME 100 comprises an AD unit 112. The AD unit 112 is configured to calculate absolute differences (AD) data between the currently processed portions of the template and search image. The AD data is fed into a SAT unit 116. The SAT unit 116 comprises a summation unit 118 configured to calculate a sum of two or more numbers to produce SAT data. The SAT data computed by the SAT unit is fed to a SAD unit 116. The SAD unit 116 determine SAD data for result for each of a plurality of comparisons between portions of the input data.

The SAD data computed by the SAD unit 116 are stored in the shared buffer as a 3D volume of SAD results (width*height*number of offsets). In some embodiments, the BME 100 comprises a downscaling unit 120 which is configured to, prior to storing the tensor in the shared buffer 102 (i.e., in the output storage element as indicated in the first invocation data as described above), downscaling each SAD value by applying a predefined scaling equation the SAD value. For example, the downscaling unit 120 may be configured for computing the square root of the SAD value. Any other scaling equation may be used, such as logarithmic scaling or exponential scaling.

Returning to FIG. 2. The processor 200 further comprises the CE 210. A CE is a specialized component, for example utilized in image processing and computer vision tasks. A primary function of the CE is to carry out convolution operations on input data, in which the CE applies various filters or kernels across the input data. This is achieved through the convolution process, a mathematical operation where a kernel, a small matrix of weights, is systematically slid over the input data (SAD data). At each position, the CE performs an element-wise multiplication of the kernel with the overlapping section of the input data, followed by summing up these products. This process effectively filters the input data, extracting and emphasizing specific features or patterns, such as edges, textures, or shapes.

The CE 210 may not only perform single-layer convolutions but can also consist of multiple convolutional layers, each with its unique set of filters or kernels. These layers are stacked in a sequence, where the output of one layer becomes the input for the next. Such multi-layer architecture enables the CE 210 to extract increasingly complex and abstract features from the input data.

Specifically, the CE 210 is configured to receiving second invocation data, the second invocation data identifying an input storage element (in the shared buffer 102), reading a tensor having a plurality of channels from the input storage element, and performing a convolutional operation on the tensor.

The processor further comprises a handling unit 208. The handling unit 208 is configured to orchestrate an interleaved iterative process involving the BME 100 and the CE 210. The handling unit 208 receives task data 202 identifying the plurality of subset of offset positions. A task issued upstream the processor 100 for execution by the processor 100 is thus described by task data 202 which may be embodied by a neural engine program descriptor (NED), which is a data structure stored in memory and retrieved by the handling unit 208. The task data 202 may comprise a separate task data for each subset of offset positions. Task data 202 will be further described below in conjunction with FIG. 5.

The handling unit 208 may further invoke loading, from external memory, of the template data and search data into the internal memory 202, for example using a DMA unit. When the loading operation is completed, e.g., the DMA unit signals that the loading is completed, the interleaved iterative process may be initiated by the handling unit 208. Specifically, the handling unit is configured for performing interleaved iterative processing of the plurality of subsets of offset positions, using the CE 210 and the BME 100, comprising, for each iteration: dispatching first invocation data to the BME 100 identifying a subset of offset positions among the plurality of subsets of offset positions; and an output storage element in the internal memory; and dispatching second invocation data to the CE 210 identifying, as input storage element, the output storage element as identified in first invocation data dispatched to the BME in a previous iteration. The output storage element and input storage element may be identified from the task data 202.

In some embodiment, the handling unit 208 employs a double buffering technique to improve efficiency of the interleaved iterative processing. In these embodiments, the internal memory 102 comprises a first storage element 204, and a second storage element 206. The interleaved iterative processing may then be performed by, for a first subset of offsets positions, dispatching first invocation data to the BME 100, the invocation data defining the first subset of offsets positions and the first storage element 204 as output storage element. Then, for each subset of offsets positions excluding the first sub-set of offsets positions, the handling unit 208 is configured to alternate between using the first 204 and the second 206 storage element as output storage element for the BME 100, and using the other one of the first 204 and second 206 storage element as the input storage element of the CE 210. During the iterative processing, for each iteration, the second invocation data, dispatched by the handling unit 208 to the CE 210, thus identifies the input storage element according to the alternating. Similarly, the first invocation data, dispatched by the handling unit 208 to the BME 100, thus identifies the output storage element according to the alternating.

Figure 5:
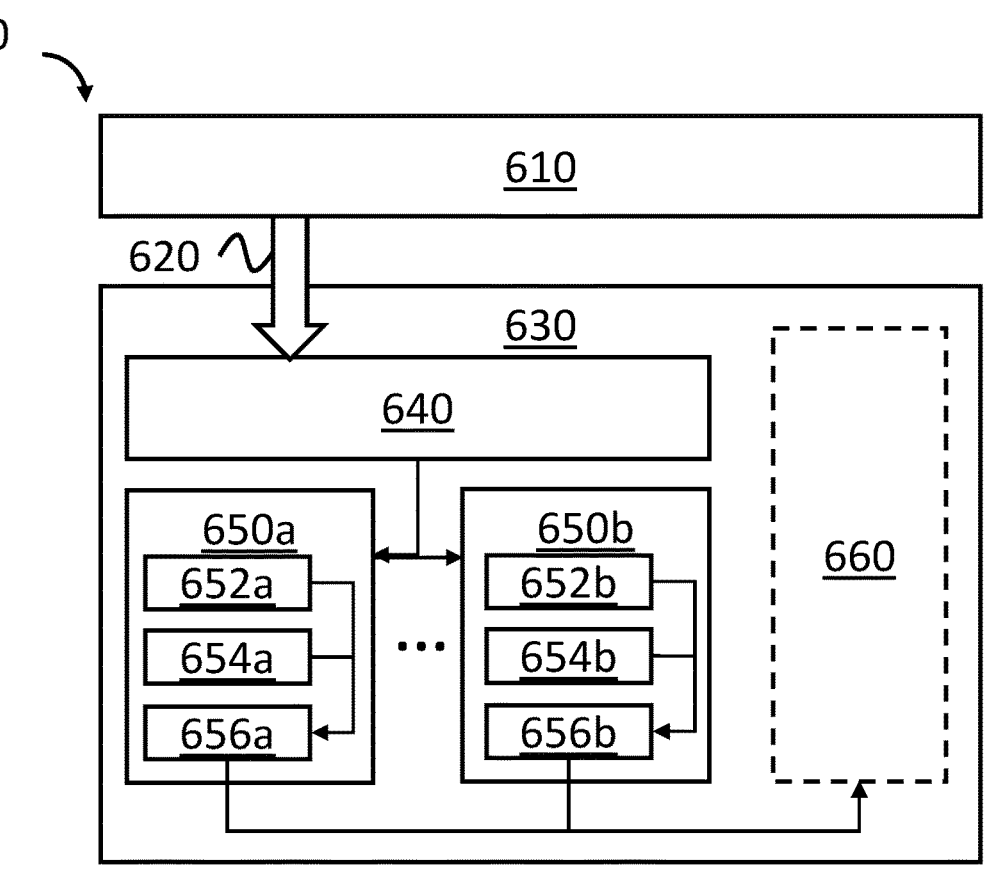
FIG. 5 illustrates schematically an example of a data processing system according to embodiments.

In FIG. 5, a processor 630 is arranged to receive a command stream 620 from a host processor 610, such as a central processing unit (CPU). The command stream comprises at least one command in a given sequence, each command to be executed, and each command may be decomposed into a number of tasks, such as tasks identifying subsets of offset positions discussed in this document.

The host processor 610 may for example be configured to receive input data, the input data comprises the first data frame, the second data frame and a data size. For example, in a given video sequence, the term 'first data frame' refers to a particular image frame, which could be any frame within the sequence. The 'second data frame' may be the image frame that directly precedes this first data frame in the same video sequence. The goal of using these two frames may be to calculate motion vectors that represent the movement or changes from the second frame to the first frame. These motion vectors can be used for various applications such as compressing the video (to reduce file size or improve streaming quality) and image warping (altering the shape or structure of objects within the frame for effects or corrections). The host processor may divide the first data frame into a plurality of first data according to the data size and divide the second data frame into a plurality of second data according to the data size. The host processor 610 may then issue a plurality of task data, each task data describing a combined block matching and convolutional operation task to be executed to an offload processor, each task data identifying a first data among the plurality of first data, and a second data among the plurality of second data as well as a subset of offset positions as described herein.

The host processor 610 may thus be configured to divide a set of offset positions, in combination defining a search window, i.e., as illustrated in FIGS. 3-4, into a plurality of subset of offset positions. The size of each subset may be configured according to available computational power of offload processor(s) that will perform the task, available memory of such offload processor(s), as well as a desired throughput. When dividing the set of offset positions into a plurality of subsets of offset positions, the host processor 610 may be configured for dividing the set of offset positions into a plurality of subsets of offset position by defining each subset with a predetermined number of offset positions. The host processor 610 may be configured for skipping one or more of the offset positions in the set of offset positions when dividing the search window into a plurality of sub-search windows. The skipping may be done such that each subset comprises the predetermined number of offset positions. The skipping may further be done to reduce the number of offset positions according to available computational power of offload processor(s) that will perform the task, available memory of such offload processor(s), as well as a desired throughput.

The host processer 610 may further configured for ordering the set of offset positions according to a predefined search pattern (i.e., as illustrated in FIGS. 3-4), wherein the skipping one or more of the offset positions comprises skipping one or more offset positions ordered last in the ordered set of offset positions (for example the offset positions near the edge of a circular or elliptical search window. The host processor 610 may be configured for dividing the set of offset positions into a plurality of subsets of offset positions by defining each subset with continuous offset positions from the search window in one of a: vertical direction or horizontal direction, for example as discussed above in conjunction with FIG. 4.

The scheduling of the tasks may be implemented by a command processing unit 640. The command stream 620 is thus sent by the host processor 610 and is received by the command processing unit 640 which is arranged to schedule the commands within the command stream 620 in accordance with their sequence. The command processing unit 640 is arranged to schedule the commands and decompose each command in the command stream 620 into at least one task. Once the command processing unit 640 has scheduled the commands in the command stream 620, and generated a plurality of tasks for the commands, the command processing unit issues each of the plurality of tasks to at least one compute unit 650a, 650b each of which are configured to process at least one of the plurality of tasks. Each of the compute units 650a, 650b may comprise a BME 100 and a CE 210 as discussed herein.

The processor 630 (also referred to as an offload processor) may comprises one or more compute units 650a, 650b. Each compute unit 650a, 650b, may be a shader core of a GPU specifically configured to undertake a number of different types of operations, however it will be appreciated that other types of specifically configured processor may be used, such as a general-purpose processor configured with individual compute units, such as compute units 650a, 650b. Each compute unit 650a, 650b comprises a number of components, and at least a first processing module 652a, 652b for executing tasks of a first task type, and a second processing module 654a, 654b for executing tasks of a second task type, different from the first task type. In some examples, the first processing module 652a, 652b may be a processing module for processing neural processing operations. In these cases, the first processing module 652a, 652b is for example a neural engine. Similarly, the second processing module 654a, 654b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the first processing module 652a, 652b of a given compute unit 650a, 650b, and tasks of a second task type to the second processing module 654a, 354b of a given compute unit 650a, 650b. The command processing unit 640 would issue machine learning/neural processing tasks (such as block matching and convolutional operations) to the first processing module 652a, 652b of a given compute unit 650a, 650b where the first processing module 652a, 652b is optimized to process neural network processing tasks, for example by comprising an efficient means of handling a large number of multiply-accumulate operations. Similarly, the command processing unit 640 would issue graphics processing tasks to the second processing module 654a, 654b of a given compute unit 650a, 650b where the second processing module 652a, 654a is optimized to process such graphics processing tasks. Examples of such graphics processing tasks include using a compute shader, wherein the task data sent to the second processing module 652a, 654a identifies motion vectors between the first image frame and the second image frame. The compute shader may for example perform image warping, optical flow applications for super resolution, reduction of unwanted motion blur in images, etc.

In addition to comprising a first processing module 652a, 652b and a second processing module 654a, 654b, each compute unit 650a, 650b also comprises a memory in the form of a local cache 656a, 656b (such as the shared buffer 102 in FIG. 2) for use by the respective processing module 652a, 652b, 654a, 654b during the processing of tasks. Examples of such a local cache 656a, 656b is a L1 cache. The local cache 656a, 656b may, for example, a synchronous dynamic random-access memory (SDRAM). For example, the local cache 656a, 656b may comprise a double data rate synchronous dynamic random-access memory (DDR-SDRAM). It will be appreciated that the local cache 656a, 656b may comprise other types of memory.

The local cache 656a, 656b is used for storing data relating to the tasks which are being processed on a given compute unit 650a, 650b by the first processing module 652a, 652b and second processing module 654a, 654b. It may also be accessed by other processing modules (not shown) forming part of the compute unit 650a, 650b the local cache 656a, 656b is associated with. However, in some examples, it may be necessary to provide access data associated with a given task executing on a processing module of a given compute unit 650a, 650b to a task being executed on a processing module of another compute unit (not shown) of the processor 630. In such examples, the processor 630 may also comprise storage 660, for example a cache, such as an L2 cache, for providing access to data use for the processing of tasks being executed on different compute units 650a, 650b.

By providing a local cache 656a, 656b tasks which have been issued to the same compute unit 650a, 650b may access data stored in the local cache 656a, 656b, regardless of whether they form part of the same command in the command stream 620. The command processing unit 640 is responsible for allocating tasks of commands to given compute units 650a, 650b such that they can most efficiently use the available resources, such as the local cache 656a, 656b, thus reducing the number of read/write transactions required to memory external to the compute units 650a, 650b, such as the storage 660 (L2 cache) or higher level memories. One such example, is that a task of one command issued to a first processing module 652a of a given compute unit 650a, may store its output in the local cache 656a such that it is accessible by a second task of a different (or the same) command issued to a given processing module 652a, 654a of the same compute unit 650a.

One or more of the command processing unit 640, the compute units 650a, 650b, and the storage 660 may be interconnected using a bus. This allows data to be transferred between the various components. The bus may be or include any suitable interface or bus. For example, an ARM® Advanced Microcontroller Bus Architecture (AMBA®) interface, such as the Advanced extensible Interface (AXI), may be used.

Figure 6:
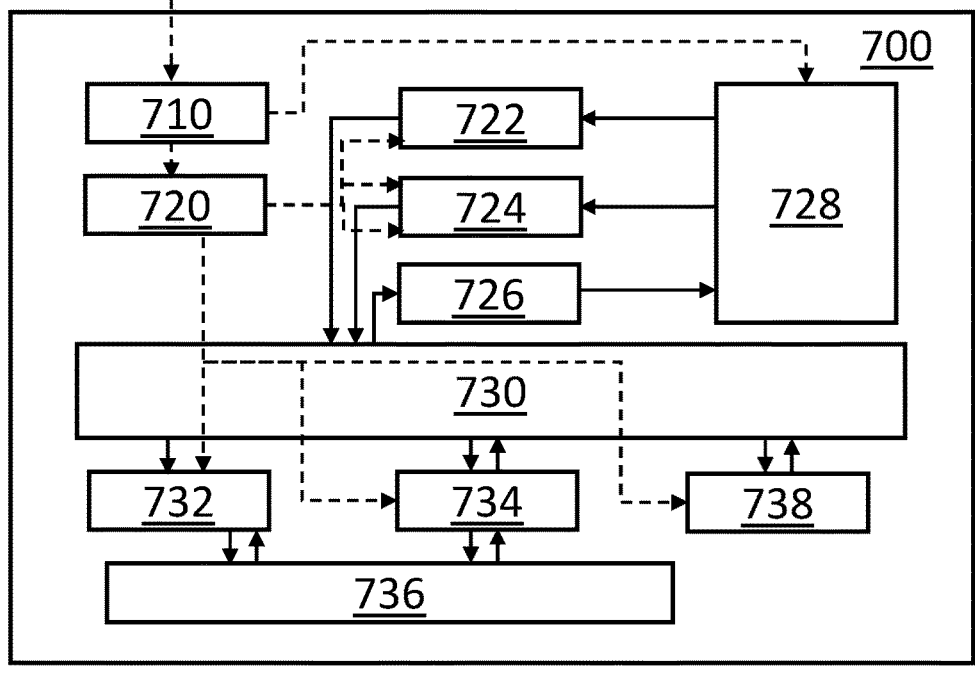
FIG. 6 illustrates a schematic diagram of a neural engine according to embodiments.

FIG. 6 is a schematic diagram of a neural engine 700, which in this example is used as a first processing module 652a, 652b in a data processing system 600 in accordance with FIG. 5. The neural engine 700 includes a command and control module 710. The command and control module 710 receives tasks from the command processing unit 640 (shown in FIG. 5), and also acts as an interface to storage external to the neural engine 700 (such as a local cache 656a, 656b and/or a L2 cache 660) which is arranged to store data to be processed by the neural engine 700 such as data representing a tensor, or data representing a stripe of a tensor. The external storage may additionally store other data to configure the neural engine 700 to perform particular processing and/or data to be used by the neural engine 700 to implement the processing such as neural network weights.

The command and control module 710 interfaces to a handling unit 720 (such as the handling unit 208 in FIG. 2), which is for example a traversal synchronization unit (TSU). In this example, each task corresponds to a subset of offset positions operated upon in accordance with the interleaved process described herein.

In this example, the handling unit 720 implements interleaved iterative processing involving the CE and BME as described herein.

The handling unit 720 may obtains, from storage external to the neural engine 700 such as the L2 cache 660, the task data defining the subsets of offset positions.

The handling unit 720 coordinates the interaction of internal components (also referred to as execution units herein) of the neural engine 700. The internal components in combination implements the BME 100, CE 210, and optionally the motion vector determining unit. The internal components include for example a weight fetch unit 722, an input reader 724, an output writer 726, a direct memory access (DMA) unit 728, a dot product unit (DPU) array 730, a vector engine 732, a transform unit 734, an accumulator buffer 736, and a storage 738, for processing of blocks of data. The data dependencies across the functional units are tracked by the handling unit 720. Processing is initiated by the handling unit 720 in a functional unit if all input blocks are available and space is available in the storage 738 of the neural engine 700. The storage 738 may be considered to be the shared buffer, in that various functional units of the neural engine 700 share access to the storage 738.

The weight fetch unit 722 may fetch weights associated with the neural network from external storage and stores the weights in the storage 738. The input reader 724 may read data to be processed by the neural engine 700 (e.g., by the BME 100) from external storage, such as a block of data representing parts of images used for block matching. The output writer 726 writes data obtained after processing by the neural engine 700 to external storage (such as for example motion vectors). The weight fetch unit 722, input reader 724 and output writer 726 interface with the external storage (which is for example the local cache 656a, 656b, which may be a L1 cache such as a load/store cache) via the DMA unit 728.

Data is processed by the neural engine 700 to generate output data corresponding to an operation, for example a block matching operation by BME 100 or a convolutional operation on SAD data by the CE 210. The result of each operation is stored in a specific pipe within the neural engine 700. The DPU array 730 is arranged to perform one or more operations associated with a dot product operation between two operands, such as between an array of weights and a corresponding block of data (e.g., representing part of a tensor). The vector engine 732 is arranged to perform elementwise operations, for example to apply scale parameters to scale an output of a dot product calculated by the DPU array 730. Data generated during the course of the processing of a task may be transmitted for temporary stage in the accumulator buffer 736, from where it may be retrieved by either the DPU array 730 or the vector engine 732 (or another different execution unit) for further processing as desired.

The transform unit 734 is arranged to perform in-block transforms such as dimension broadcasts or axis swaps. The transform unit 734 obtains data from a pipe, such as storage 738 (e.g., after processing by the DPU array 730 and/or vector engine 732) and writes transformed data back to the storage 738.

To make efficient use of the storage 738 available within the neural engine 700, the handling unit 720 determines an available portion of the storage 738, which is available during execution of tasks. The handling unit 720 determines a mapping between at least one logical address associated with data generated during execution of the task and at least one physical address of the storage 738 corresponding to the available portion. The logical address is for example a global address in a global coordinate system. Hence, by altering the physical address corresponding to a given logical address, the handling unit 720 can effectively control usage of the storage 738 without requiring a change in software defining the operation to be performed, as the same logical address can still be used to refer to a given element of the tensor to be processed. The handling unit 720 identifies the at least one physical address corresponding to the at least one logical address, based on the mapping, so that data associated with the logical address is stored in the available portion. The handling unit 720 can perform the mapping process according to any of the examples herein, for example to determine output storage element for the BME 100 and input storage element for the CE 210. The handling unit may determine output storage element for the BME 100 and input storage element for the CE 210 according to the double buffering strategy.

All storage in the neural engine 700 may be mapped to corresponding pipes, including look-up tables, accumulators, etc. If the neural engine supports 2 look-up tables (LUTs), then a maximum of 2 pipes could be used to target the LUTs to avoid needing to thrash the LUT storage; LUT pipes might then be single buffered. All other pipes could be mapped to a common Shared Buffer (or portions thereof) with fewer restrictions. Width and height of pipe can also be programmable, resulting a highly configurable mapping between pipes and storage elements within the neural engine 700.

FIG. 7 shows schematically a system 800 for allocating handling of data, and in some examples generating a plurality of blocks of input data for processing.

The system 800 comprises host processor 810, which may be similar to or the same as the processor 610 of FIG. 5, such as a central processing unit, or any other type of general processing unit. The host processor 810 issues a command stream comprising a plurality of commands, each having at least one task (e.g., a task identifying a subset of offset positions as described herein) associated therewith.

The system 800 also comprises a processor 830, which may be similar to or the same as the processor 630 of FIG. 5, and may comprise at least some of the components of and/or be configured to perform the methods described herein. The processor 830 comprises at least a plurality of compute units 650a, 650b and a command processing unit 640. Each compute unit may comprise a plurality of processing modules each configured to perform at least one type of operation. The system 800 may also include at least one further processor (not shown), which may be the same as the processor 830. The processor 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 650a, 650b of a processor 830 so as to maximize the usage of the local cache 656a, 656b.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory'. The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processor 810, the processor 830, and the memory 820 may be interconnected using a system bus 840. This allows data to be transferred between the various components. The system bus 840 may be or include any suitable interface or bus. For example, an ARM® Advanced Microcontroller Bus Architecture (AMBAR) interface, such as the Advanced extensible Interface (AXI), may be used.

Miscellaneous

In summary, in the present disclosure, a processor, method, and non-transitory computer-readable storage medium for processing template data and search data according to a search window applied to the search data are provided. The search window comprising a set of offset positions. The processing is performed by a block matching engine (BME) that produces a tensor with sum-of-absolute-difference values, and a convolutional engine (CE) that performs a convolutional operation on the tensor. The processing is performed in an iterative interleaved fashion, by dividing the set of offset positions into a plurality of subsets of offset positions. In parallel with processing of the first X offset positions by the CE, the BME generates the next X channels of the tensor, and which are subsequently pipelined through to the CE via an internal storage, etc.

At least some aspects of the examples described herein comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

EXAMPLE CLAUSES

A: A processor for processing template data and search data according to a search window applied to the search data, the search window comprising a set of offset positions, the processor comprising an internal memory, a handling unit, a convolutional engine, CE, and a block matching engine, BME, wherein the BME being configured to indicate a measure of similarity between template data and search data, the BME configured for:

receiving first invocation data indicating a plurality of offset positions, and an output storage element; and determining a tensor having a plurality of channels, by, for each offset position, offsetting the search data according to the offset position, determining difference values between the template data and the offset search data, writing the difference values in a channel of the tensor; and storing the tensor in the output storage element;

the CE configured for:

receiving second invocation data, the second invocation data identifying an input storage element, reading a tensor having a plurality of channels from the input storage element, and performing a convolutional operation on the tensor;

the handling unit configured for:

accessing a plurality of subsets of offset positions from the set of offset positions;

performing interleaved iterative processing of the plurality of subsets of offset positions, using the CE and the BME, comprising, for each iteration:

dispatching first invocation data to the BME identifying a subset of offset positions among the plurality of subsets of offset positions; and an output storage element in the internal memory; and dispatching second invocation data to the CE identifying, as input storage element, the output storage element as identified in first invocation data dispatched to the BME in a previous iteration;

wherein the processor is configured for storing a result from the convolutional operation performed by the CE in internal memory.

B: The processor of clause A, wherein the internal memory comprises a first and a second storage element, wherein the handling unit is configured for performing the interleaved iterative processing of the plurality of subsets of offset position by:

for a first subset of offsets positions, dispatching first invocation data to the BME, the invocation data defining the first subset of offsets positions and the first storage element as output storage element;

for each subset of offsets positions excluding the first sub-set of offsets positions:

alternating between using the first and the second storage element as output storage element for the BME, and using the other one of the first and second storage element as the input storage element of the CE;

dispatching second invocation data to the CE identifying the input storage element according to the alternating;

dispatching first invocation data to the BME indicating the subset of offsets positions and the output storage element according to the alternating.

C: The processor of any one of clause A-B, wherein each subset of offset positions comprises a predetermined number of offset positions.

D: The processor of clause C, wherein the predetermined number of offset positions is a multiple of 8.

E: The processor of any one of clause C-D, wherein one or more of the offset positions in the set of offset positions are skipped in the plurality of subset of offset positions, such that each subset comprises the predetermined number of offset positions.

F: The processor of clause E, wherein the set of offset positions is ordered according to a predefined search pattern, wherein the skipping one or more of the offset positions comprises skipping one or more offset positions ordered last in the ordered set of offset positions.

G: The processor of any one of clause A-F, wherein each subset comprises continuous offset positions from the search window in one of a: vertical direction or horizontal direction.

H: The processor of any one of clause A-G, further comprises a motion vector determining unit configured to read the stored output from the CE, and process the output to determine the plurality of motion vectors defining data movements between the template data and search data.

I: The processor of any one of clause A-H, wherein search window is one of: rectangular, elliptical, or circular.

J: The processor of any one of clause A-I, wherein the BME is configured for, prior to storing the tensor in the output storage element, downscaling each difference value by applying a predefined scaling equation to the difference value.

K: The processor of clause J, wherein the BME is configured for applying the predefined scaling equation to the difference value by computing the square root of the difference value.

L: The processor of any one of clause A-K, wherein the template data and the search data each comprises a 2D tensor.

M: A method performed by a processor when processing template data and search data according to a search window applied to the search data, the search window comprising a set of offset positions, the processor comprising an internal memory; the method comprising:

accessing a plurality of subsets of offset positions from the set of offset positions;

performing interleaved iterative processing of the plurality of subsets of offset positions, comprising, for each iteration:

dispatching first invocation data identifying a subset of offset positions among the plurality of subsets of offset positions; and an output storage element in the internal memory;

determining a tensor having a plurality of channels, by, for each offset position of the subset of offset positions identified in the first invocation data, offset the search data according to the offset position, determining difference values between the template data and the offset search data, writing the difference values in a channel of the tensor; and storing the tensor in the output storage element identified in the first invocation data;

dispatching second invocation data identifying, as an input storage element, the output storage element as identified in first invocation data dispatched in a previous iteration;

reading a tensor having a plurality of channels from the input storage element identified in the second invocation data, performing a convolutional operation on the tensor; and storing a result from the convolutional operation in internal memory.

N: The method of clause M, wherein the internal memory comprises a first and a second storage element, wherein performing the interleaved iterative processing of the plurality of subsets of offset position comprises:

for a first subset of offsets positions, dispatching first invocation data the invocation data defining the first subset of offsets positions and the first storage element as output storage element;

for each subset of offsets positions excluding the first sub-set of offsets positions:

alternating between using the first and the second storage element as output storage element of first invocation data, and using the other one of the first and second storage element as the input storage element second invocation data;

dispatching second invocation identifying the input storage element according to the alternating;

dispatching first invocation data indicating the subset of offsets positions and the output storage element according to the alternating.

O: The method of any one of clause M-N, wherein each subset of offset positions comprises a predetermined number of offset positions.

P: The method of clause O, wherein one or more of the offset positions in the set of offset positions are skipped in the plurality of offset positions, such that each subset comprises the predetermined number of offset positions.

Q: The method of clause P, wherein the set of offset positions is ordered according to a predefined search pattern, wherein the skipping one or more of the offset positions comprises skipping one or more offset positions ordered last in the ordered set of offset positions.

R: The method of any one of clause M-Q, further comprising: process results from the convolutional operation to determine the plurality of motion vectors defining data movements between the template data and search data.

S: The method of any one of clause M-R, further comprising: prior to storing the tensor in the output storage element, downscaling each difference value by applying a predefined scaling equation the difference value.

T: A non-transitory computer-readable storage medium comprising a set of computer-readable instructions stored thereon which, when executed by a processor, comprising an internal memory, are arranged to cause the processor to process template data and search data according to a search window applied to the search data, the search window comprising a set of offset positions, by:

accessing a plurality of subsets of offset positions from the set of offset positions;

performing interleaved iterative processing of the plurality of subsets of offset positions, comprising, for each iteration:

dispatching first invocation data identifying a subset of offset positions among the plurality of subsets of offset positions; and an output storage element in the internal memory;

determining a tensor having a plurality of channels, by, for each offset position of the subset of offset positions identified in the first invocation data, offset the search data according to the offset position, difference values between the template data and the offset search data, writing the difference values in a channel of the tensor; and storing the tensor in the output storage element identified in the first invocation data;

dispatching second invocation data identifying, as an input storage element, the output storage element as identified in first invocation data dispatched in a previous iteration;

reading a tensor having a plurality of channels from the input storage element identified in the second invocation data, and performing a convolutional operation on the tensor;

storing a result from the convolutional operation in internal memory.

What is claimed is:

1. A processor for processing template data and search data according to a search window applied to the search data, the search window comprising a set of offset positions, the processor comprising an internal memory, a handling unit, a convolutional engine, CE, and a block matching engine, BME, wherein the BME being configured to indicate a measure of similarity between template data and search data, the BME configured for:

receiving first invocation data indicating a plurality of offset positions, and an output storage element; and determining a tensor having a plurality of channels, by, for each offset position, offsetting the search data according to the offset position, determining difference values between the template data and the offset search data, writing the difference values in a channel of the tensor; and storing the tensor in the output storage element;

the CE configured for:

receiving second invocation data, the second invocation data identifying an input storage element, reading a tensor having a plurality of channels from the input storage element, and performing a convolutional operation on the tensor;

the handling unit configured for:

accessing a plurality of subsets of offset positions from the set of offset positions;

performing interleaved iterative processing of the plurality of subsets of offset positions, using the CE and the BME, comprising, for each iteration:

dispatching first invocation data to the BME identifying a subset of offset positions among the plurality of subsets of offset positions; and an output storage element in the internal memory; and dispatching second invocation data to the CE identifying, as input storage element, the output storage element as identified in first invocation data dispatched to the BME in a previous iteration;

wherein the processor is configured for storing a result from the convolutional operation performed by the CE in internal memory.

2. The processor of claim 1, wherein the internal memory comprises a first and a second storage element, wherein the handling unit is configured for performing the interleaved iterative processing of the plurality of subsets of offset position by:

for a first subset of offsets positions, dispatching first invocation data to the BME, the invocation data defining the first subset of offsets positions and the first storage element as output storage element;

for each subset of offsets positions excluding the first sub-set of offsets positions:

alternating between using the first and the second storage element as output storage element for the BME, and using the other one of the first and second storage element as the input storage element of the CE;

dispatching second invocation data to the CE identifying the input storage element according to the alternating;

dispatching first invocation data to the BME indicating the subset of offsets positions and the output storage element according to the alternating.

3. The processor of claim 1, wherein each subset of offset positions comprises a predetermined number of offset positions.

4. The processor of claim 3, wherein the predetermined number of offset positions is a multiple of 8.

5. The processor of claim 3, wherein one or more of the offset positions in the set of offset positions are skipped in the plurality of subset of offset positions, such that each subset comprises the predetermined number of offset positions.

6. The processor of claim 5, wherein the set of offset positions is ordered according to a predefined search pattern, wherein the skipping one or more of the offset positions comprises skipping one or more offset positions ordered last in the ordered set of offset positions.

7. The processor of claim 1, wherein each subset comprises continuous offset positions from the search window in one of a: vertical direction or horizontal direction.

8. The processor of claim 1, further comprises a motion vector determining unit configured to read the stored output from the CE, and process the output to determine the plurality of motion vectors defining data movements between the template data and search data.

9. The processor of claim 1, wherein search window is one of: rectangular, elliptical, or circular.

10. The processor of claim 1, wherein the BME is configured for, prior to storing the tensor in the output storage element, downscaling each difference value by applying a predefined scaling equation to the difference value.

11. The processor of claim 10, wherein the BME is configured for applying the predefined scaling equation to the difference value by computing the square root of the difference value.

12. The processor of claim 1, wherein the template data and the search data each comprises a 2D tensor.

13. A method performed by a processor when processing template data and search data according to a search window applied to the search data, the search window comprising a set of offset positions, the processor comprising an internal memory; the method comprising:

accessing a plurality of subsets of offset positions from the set of offset positions;

performing interleaved iterative processing of the plurality of subsets of offset positions, comprising, for each iteration:

dispatching first invocation data identifying a subset of offset positions among the plurality of subsets of offset positions; and an output storage element in the internal memory;

determining a tensor having a plurality of channels, by, for each offset position of the subset of offset positions identified in the first invocation data, offset the search data according to the offset position, determining difference values between the template data and the offset search data, writing the difference values in a channel of the tensor; and storing the tensor in the output storage element identified in the first invocation data;

dispatching second invocation data identifying, as an input storage element, the output storage element as identified in first invocation data dispatched in a previous iteration;

reading a tensor having a plurality of channels from the input storage element identified in the second invocation data, performing a convolutional operation on the tensor; and storing a result from the convolutional operation in internal memory.

14. The method of claim 13, wherein the internal memory comprises a first and a second storage element, wherein performing the interleaved iterative processing of the plurality of subsets of offset position comprises:

for a first subset of offsets positions, dispatching first invocation data the invocation data defining the first subset of offsets positions and the first storage element as output storage element;

for each subset of offsets positions excluding the first sub-set of offsets positions:

alternating between using the first and the second storage element as output storage element of first invocation data, and using the other one of the first and second storage element as the input storage element second invocation data;

dispatching second invocation identifying the input storage element according to the alternating;

dispatching first invocation data indicating the subset of offsets positions and the output storage element according to the alternating.

15. The method of claim 13, wherein each subset of offset positions comprises a predetermined number of offset positions.

16. The method of claim 15, wherein one or more of the offset positions in the set of offset positions are skipped in the plurality of offset positions, such that each subset comprises the predetermined number of offset positions.

17. The method of claim 16, wherein the set of offset positions is ordered according to a predefined search pattern, wherein the skipping one or more of the offset positions comprises skipping one or more offset positions ordered last in the ordered set of offset positions.

18. The method of claim 13, further comprising: process results from the convolutional operation to determine the plurality of motion vectors defining data movements between the template data and search data.

19. The method of claim 13, further comprising: prior to storing the tensor in the output storage element, downscaling each difference value by applying a predefined scaling equation the difference value.

20. A non-transitory computer-readable storage medium comprising a set of computer-readable instructions stored thereon which, when executed by a processor, comprising an internal memory, are arranged to cause the processor to process template data and search data according to a search window applied to the search data, the search window comprising a set of offset positions, by:

accessing a plurality of subsets of offset positions from the set of offset positions;

performing interleaved iterative processing of the plurality of subsets of offset positions, comprising, for each iteration:

dispatching first invocation data identifying a subset of offset positions among the plurality of subsets of offset positions; and an output storage element in the internal memory;

determining a tensor having a plurality of channels, by, for each offset position of the subset of offset positions identified in the first invocation data, offset the search data according to the offset position, difference values between the template data and the offset search data, writing the difference values in a channel of the tensor; and storing the tensor in the output storage element identified in the first invocation data;

dispatching second invocation data identifying, as an input storage element, the output storage element as identified in first invocation data dispatched in a previous iteration;

reading a tensor having a plurality of channels from the input storage element identified in the second invocation data, and performing a convolutional operation on the tensor;

storing a result from the convolutional operation in internal memory.

\* \* \* \* \*